United States Patent [19]

Itoh et al.

[11] 4,170,583
[45] * Oct. 9, 1979

[54] PHASE-REVERSIBLE COMPOSITION

[75] Inventors: Hiroyuki Itoh; Teruaki Yamanashi; Hirosuke Imai, all of Yokohama, Japan

[73] Assignee: Nippon Oil Company Limited, Tokyo, Japan

[*] Notice: The portion of the term of this patent subsequent to Feb. 7, 1995, has been disclaimed.

[21] Appl. No.: 851,959

[22] Filed: Nov. 16, 1977

Related U.S. Application Data

[63] Continuation-in-part of Ser. No. 788,919, Apr. 19, 1977, abandoned.

[30] Foreign Application Priority Data

Sep. 6, 1977 [JP] Japan ................................. 51-47037

[51] Int. Cl.$^2$ ............................. C08L 9/00; C08L 9/10
[52] U.S. Cl. ...................... 260/29.7 H; 260/29.7 M; 260/29.7 N
[58] Field of Search ................... 260/29.7 H, 29.7 M, 260/29.7 N; 526/224, 227

[56] References Cited

U.S. PATENT DOCUMENTS

| | | | |
|---|---|---|---|
| 2,930,775 | 3/1960 | Fordyce | 260/29.7 H |
| 2,959,821 | 11/1960 | Kolb | 260/29.7 H |
| 3,284,380 | 11/1966 | Davis | 260/29.7 H |
| 3,448,088 | 6/1969 | Azorlosa | 260/29.7 H |
| 3,920,769 | 11/1975 | Yaginuma et al. | 260/29.7 D |
| 3,928,498 | 12/1975 | Uraneck et al. | 526/224 |
| 3,931,092 | 1/1976 | Ramlow et al. | 526/224 |
| 3,960,824 | 6/1976 | Hicks | 526/224 |
| 4,027,646 | 2/1978 | Ito et al. | 260/29.7 N |

*Primary Examiner*—Maurice J. Welsh
*Attorney, Agent, or Firm*—Bucknam and Archer

[57] ABSTRACT

A phase-reversible composition is disclosed, which is liquid at a low temperature and solid at a high temperature, the phase being reversible. The composition includes a conjugated diene-maleic acid derivative copolymer having a sulfur containing organic terminal radical of from 4 to 30 carbon atoms, which radical contributes to increased surface-activity and compatibility of the final composition.

5 Claims, No Drawings

PHASE-REVERSIBLE COMPOSITION

This application is a continuation-in-part of Ser. No. 788,919 filed Apr. 19, 1977, now abandoned.

BACKGROUND OF THE INVENTION

1. Field of Invention

This invention relates to phase-reversible compositions for use in the manufacture of adhesives, fire extinguishing agents, viscosity control agents, tackifiers, coating agents, dye assitants and the like. The compositions under contemplation are reversible in the phase between liquid at a low temperature and solid at a high temperature, and having excellent compatibility and surface-active properties.

2. Prior Art

Known as such phase-reversible compositions are, for example, methylcellulose and polyoxyethylene solution of water, both being liquid at a low temperature due to hydration of their hydrophillic groups and solid at elevated temperature due to a decrease in the hydration effects. These high molecular materials have a common drawback in that they tend to release therefrom free water when changing into a solid phase at increased temperature, and hence prolonged length of time is required to bring them back into a liquid state similar to that which has existed prior to the heating.

With a view to eliminating or alleviating the above-noted drawback of the prior art compositions, the present inventors have previously developed and introduced certain improved compositions as disclosed in copending U.S. patent application Ser. No. 624,225, now U.S. Pat. No. 4,072,646 the compositions of which essentially comprise (1) high-molecular anions resulting from the dissociation of the carboxylic group of a conjugated dienemaleic acid derivative copolymer, (2) alkali metal cations or ammonium cations, (3) magnesium ions, (4) anions which form water-soluble magnesium compounds with Mg++, and (5) water. The compositions of the copending patent application were reversible between liquid and solid at increased rate of speed and in addition, were extremely easy to control their viscosity at low temperature and their gel strength at high temperature. For these advantages, the prior compositions of the present inventors have been found useful in the preparation of fire extinguishing agents, textile printing materials, glues, viscosity-control agents, water-soluble quenching media and the like. However, it was later found that the prior compositions are not completely satisfactory in their compatibility with other water-soluble organic materials and furthermore somewhat poor in their surface-active properties such as foaming ability, dispersability and emulsifiability.

SUMMARY OF THE INVENTION

It is therefore the primary object of the present invention to provide improved compositions which are reversible in the phase between liquid and solid and which are further characterized by high compatibility with other water-soluble organic materials and increased surface-activity.

In accordance with the present invention, there is provided an improved phase-reversible composition which comprises (A) a high-molecular anion resulting from the dissociation of at least a part of the carboxylic group of a conjugated diene-maleic acid derivative copolymer, having repeating units of the formulae

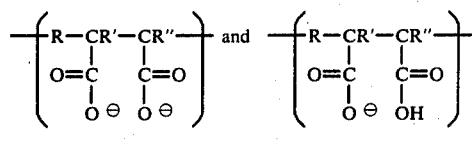

wherein R represents a conjugated diene unit in the copolymer; R' and R" each represent hydrogen, a halogen atom or an organic radical having from 1 to 18 carbon atoms, and having terminal groups of the formula $$R'''-Y- \qquad (III)$$

wherein R''' represents an organic radical having from 4 to 30 carbon atoms; and Y represents, S or SO$_2$ (B) one or more cations of alkali metal cations selected from the group consisting of Na$^+$, K$^+$, Li$^+$ and ammonium cations of the formula $$R_1R_2R_3R_4N^+ \qquad (IV)$$

wherein R$_1$, R$_2$, R$_3$, and R$_4$ are the same or different, each selected from the group consisting of hydrogen, alkyl radical, cycloalkyl radical, aryl radical and aralkyl radical, having from 1 to 18 carbon atoms, said cations being from 0.5 to 5.0 equivalents based on the maleic acid derivative unit in the Component (A); (C) Mg$^{2+}$ of from 0.5 to 2.0 equivalents based on the maleic acid derivative unit in the Component (A); (D) one or more anions which form a water-soluble magnesium compound with Mg++, said anion being from 0.5 to 7.0 equivalents based on the maleic acid derivative unit in the Component (A); and (E) water in an amount from 1 to 1,000 times the total weight of the Components (A), (B), (C) and (D).

The invention will be better understood from the detailed description of certain preferred embodiments which follows.

DETAILED DESCRIPTION OF THE PREFERRED EMBODIMENTS

Each of the above components which constitute the phase-reversible compositions of the invention will now be described in greater detail.

The Component (A) is a high-molecular anion resulting from the dissociation of at least a part of the carboxylic group of a conjugated diene-maleic acid derivative copolymer, having repeating units of the formulae

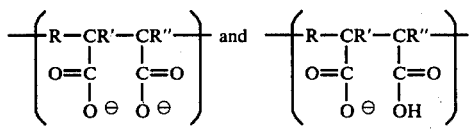

wherein R represents a conjugated diene unit in the copolymer; R' and R" each represent hydrogen, a halogen atom or an organic radical such as alkyl, cycloalkyl or aryl radical having from 1 to 18 carbon atoms. The degree of dissociation represented in terms of the ratio of I:II is in the range of from 100:0 to 0:100, preferably from 100:0 to 50:50. It is preferable that undissociated unit such as

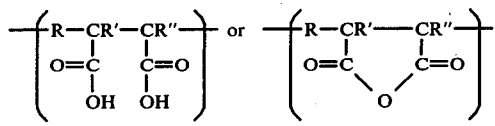

is not present in said copolymer.

The Component (A) is also an anion of a conjugated diene-maleic acid derivative copolymer having terminal groups represented by R'''—Y— as defined above. Conjugated dienes used in the preparation of the starting conjugated diene-maleic acid derivative are usually aliphatic or cyclic compounds of 4–20 carbon atoms with conjugated ethylenic double bonds including, for example, butadiene, isoprene, chloroprene, 2,3-dimethylbutadiene, 2,3-dichlorobutadiene, piperilene, 2-methyl-1,3-hexadiene and 1-methoxy-1,3-butadiene. The maleic acid derivative unit includes maleic acid, chloromaleic acid, dichloromaleic acid and citraconic acid and their anhydride. The terminal radical expressed by R''' is an organic radical such as alkyl, cycloalkyl, aryl or aralkyl radical having from 4 to 30 carbons, preferably from 6 to 20. Examples of the R'''-terminal radical are a primary straight-chain alkyl radical such as 1-butyl, 1-pentyl, 1-hexyl, 1-heptyl, 1-octyl, 1-nonyl, 1-decyl, 1-dodecyl, 1-tetradecyl, 1-hexadecyl, 1-octadecyl and 1-eicocyl radicals. The R''' terminal radical further includes, secondary and tertiary alkyl radicals. As such terminal radicals may be aryl or substituted-aryl radicals such as phenyl, ortho-, meta- and para-toluyl, alpha-toluyl, alpha- and beta-naphthyl, aralkyl radicals such as phenylbutyl, phenylpentyl, phenylhexyl, phenyloctyl, phenylnonyl, phenyldecyl, phenyldodecyl, phenyltetradecyl, phenylhexadecyl, phenyloctadecyl, and cycloalkyl radicals such as cyclopexyl, cyclooctyl and cyclododecyl. The terminal group (R'''—Y—) usually exist in amounts of from 0.5 to 30 weight percent of the polymer, preferably from 1.0 to 20 weight percent. Less than 0.5 percent fails to exhibit the desired function of the terminal radical, while more than 30 percent necessarily results in reduced molecular weight, hence polymeric characteristics.

The conjugated diene-maleic acid derivative copolymer which is a starting material for the Component (A) may be prepared by a polymerization process for example using radical generating catalysts, ultraviolet rays, ionization radiant rays or organometallic catalysts. An important aspect of the invention resides in the incorporation into the conjugated diene-maleic acid derivative copolymer of such terminal groups which have been defined above. This may be accomplished for example by introducing a sulfur-containing compound into the polymerization system, such compound being thiol or disulfide which is known for its large constant of chain transfer to polymer. The copolymer thereby obtained possesses an R'''—S— terminal group. The type of mercaptan or disulfide to be used depends upon the type of terminal radical desired and in some instance should be chosen in relation to the molecular weight of a particular starting copolymer. Typical examples of thiol and disulfide are compounds usually having 4 to 30, preferably 6 to 20, carbon atoms, such as 2-methyl-2-propanethiol, 1-butanethiol, 2-butanethiol, 1,1,3,3-tetramethylbutanethiol, 1-pentanethiol, 1-hexanethiol, 2-hexanethiol, 1,1,3,3-tetramethyl-1-hexanethiol, 1,1,3,3,5,5-hexamethyl-1-hexanethiol, 1-heptanethiol, 1-decanethiol, 1-octanethiol, 1,1,3,3,5,5,7,7-1-octanethiol, 1-dodecanethiol, 1-tetradecanethiol, 1-octadecanethiol, benzenethiol, p-chlorobenzenthiol, o-toluenethiol, m-toluenthiol, p-toluenethiol, α-toluenethiol, 1-naphthalenethiol, phenyldodecanethiol, phenyloctanethiol, cyclohexanethiol, butylsulfide, butyldisulfide, benzoyldisulfide, bis(p-chlorobenzoyl)disulfide dodecylsulfide and two or more mixtures thereof. The amount of these materials used in accordance with the invention is subject to the molecular weight of a desired starting copolymer, and it is generally of the order of 0.5 to 60 weight percent, preferably 1.0 to 30 weight percent of the total monomer.

The process of preparing the conjugated diene-maleic acid derivative copolymer having the specified terminal radical according to the invention is a radical polymerization employing radical initiators such as azo-compounds or peroxides capable of generating radicals when cleaved with heat. Generated radicals attack monomers thereby initiating the polymerization thereof. The polymers thus obtained have a small amount of a structure terminating with a radical-initiator residue besides the terminal group R'''—Y—. Those polymers can be used as the polymers of the invention. Examples of such radical initiators include lauroylperoxide, bis-3,5,5-trimethylhexanoyl peroxide, di-isopropylbenzene hydroperoxide, t-butylperoxy-3,5,5-trimethylhexanoate and t-butylperoxyneodecanoate. The polymer having the terminal group R''—SO$_2$— is obtain for example by oxidation of the polymer having the terminal group R''—S— said above.

It has now been found that the excellent properties of the compositions provided in accordance with the invention including phase-reversibility, compatibility and surface-activity are all attributable to an oleophilic radical introduced at the terminal of a high-molecular anion which forms a part of the Component (A). The Y-portion of the R'''—Y— radical serves to bridge between the oleophilic terminal radical and a hydrophilic polymer portion.

The conjugated dienes employed according to the invention are, for example, butadiene, isoprene, chloroprene, 2,3-dimethylbutadiene, 2,3-dichlorobutadiene, piperylene, 2-methyl-1,3-hexadiene, and 1-methoxy-1,3-butadiene. The maleic-acid derivative according to the invention are maleic acid, maleic acid anhydride, chlormaleic acid anhydride, chlormaleic acid, dichlormaleic acid, citraconic acid anhydride, maleic monoalkylester, and maleic dialkylester.

The conjugated diene-maleic acid derivative copolymer having the above-specified terminal radical is subjected to reaction with a base in water whereby a high-molecular anion in the Component (A) is formed. This reaction progresses very satisfactorily where the maleic acid derivative unit in the copolymer is maleic acid, maleic acid anhydride or citraconic acid. If this derivative unit is maleic monoalkylester or maleic dialkylester, the base also functions as a hydrolysis catalyst and therefore, eventually there can be obtained the desired high-molecular anion of the Component (A). The anion may be also obtained by hydrolysis of maleic monoalkyl or dialkyl ester in the presence of an acid catalyst, followed by the addition of a predetermined amount of base.

Preferred conjugated diene-maleic acid derivative copolymers used as a starting material for the Component (A) should have an intrinsic viscosity of the order of 0.01 to 2.0, preferably 0.1 to 1.0 as measured in various kinds of solvents at 30° C. The composition ratio of conjugated diene unit to maleic acid derivative unit can be determined by NMR spectrum or potassium hydroxide titration. Generally, most such conjugated diene-maleic acid derivative copolymers are a 1:1 alternate copolymer. The Component (B) is one or more of alkali metal cations consisting of $Na^+$, $K^+$ and $Li^+$ or ammonium cations represented by the formula $R_1R_2N^+R_3R_4$. When the reaction of the conjugated diene-maleic acid derivative copolymer with a base is carried out in water in order to afford the desired degree of dissociation of the high-molecular anion in the component (A), the Component (B) is incorporated as the counter cation for the high-molecular anion. The Component (B) is used in amounts preferably from 0.5 to 5.0 equivalents, more preferably from 0.8 to 2.0 equivalents based on the maleic acid derivative unit in the Component (A). As used herein, the term equivalent means that one gram ion corresponds to one mole of the maleic acid unit irrespective of the electric charge of the ion. This is accomplished by preparing the anion of the Component (A) having a predetermined degree of dissociation, employing a base of from an equivalent mole to two-fold mole of the maleic acid derivative unit in the starting conugated diene-maleic acid derivative copolymer. The progress of this reaction may be observed by IR spectrum. So long as the desired degree of dissociation is maintained in the Component (A), neutral compounds such as salts, for example, sodium chloride and sodium sulfate may be added for other purposes. However, in such instance, $Na^+$ tends to increase in the composition; therefore, the total amount of the Component (B) including the same should be in the range of from 0.5 to 5.0 equivalents.

The base used for reaction with a conjugated diene-maleic acid derivative copolymer is an alkali metal compound including sodium hydroxide, potassium hydroxide, lithium hydroxide, sodium carbonate, potassium carbonate, lithium carbonate, or an amine including ammonia, a primary amine such as methylamine, ethylamine, n-propylamine, isopropylamine, n-butylamine, sec-butylamine, tert-butylamine, n-hexylamine, n-octylamine, laurylamine, cyclohexylamine, aniline and benzylamine, a secondary amine such as dimethylamine, diethylamine, methylethylamine, dipropylamine, diisopropylamine, dibutylamine, diphenylamine, N-methylaniline, N-methylcyclohexylamine, pyrrolidine, piperidine and morpholine, a tertiary amine such as trimethylamine, triethylamine, tri-n-propylamine, triisopropylamine, tri-n-butylamine, dimethylhexylamine, tri-n-octylamine, pyridine, dimethylaniline, N-methylpyrrolidine, N-methyl-piperidine and N-methylmorpheline and a quartenary ammonium hydroxide such as tetramethyl ammonium hydroxide. Either one of these or a combination thereof may be used. The kind of the Component (B) depends upon the kind of the base or bases employed and the amount of the former upon the total amount of the latter. However, depending upon the type of process hereafter described for preparing the compositions, the amount of the Component (B) in the phase-reversible composition may not always correspond to the amount of the base used but is often less due to partial removal during the separating operation. Therefore, the amount of the Component (B) should be considered as such which is present in the final composition.

The Component (C) of the phase-reversible composition according to the present invention is magnesium ion $Mg^{2+}$. The $Mg^{2+}$ plays an important role in developing the characteristics of the composition that it is liquid at low temperature, becomes solid with increasing temperature and returns to its initial liquid state on cooling. The $Mg^{2+}$ is in the form of a water-soluble magnesium-containing compound, usually a magnesium salt. It is preferable to use a magnesium compound readily soluble in water with a view to providing $Mg^{2+}$ ions with ease during the preparation of the phase-reversible composition. Examples of such magnesium compound include mineral acid magnesium salts such as magnesium chloride, magnesium permanganate and magnesium sulfate, and organic acid magnesium salts such as magnesium acetate, magnesium propionate, magnesium formate and magnesium phthalate, as well as mixtures thereof. Any other magnesium compound which is convertible into a water-soluble one to provide $Mg^{2+}$ ion, may be also employed.

Preferred amounts of $Mg^{2+}$ ions are in the range from 0.3 to 2.0, more preferably from 0.5 to 1.5 equivalents based on the maleic acid derivative unit in the conjugated diene-maleic acid derivative copolymer of the Component (A). The amount of $Mg^{2+}$ ions should always be determined on the basis of $Mg^{2+}$ ions present in the final composition.

The Component (D) is an anion, which forms a water-soluble magnesium compound with $Mg^{++}$.

If an anion which forms water insoluble magnesium compound with $Mg^{++}$ is employed, $Mg^{++}$ is reduced to form precipitate in the composition. So the anion which forms water insolble magnesium compound is not used in the invention. The anion of the invention may be the anion residue resulting from the magnesium compound used in the preparation of the phase reversible composition after liberating $Mg^{2+}$. One kind or mixture of several kinds of anions may be used. They are inorganic anions such as for example, $Cl^-$, $Br^-$, $MnO_4^-$, $NO_3^-$, $ClO_4^-$ and $SO_4^{2-}$ or organic carboxylate anions such as $HCOO^-$, $CH_3COO^-$, $CH_3CH_2COO^-$ and

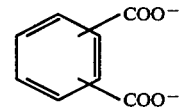

When alkali metal compounds such as their carbonates and hydrogencarbonates are employed as the base for reaction with a conjugated diene-maleic acid derivative copolymer, resulting from the dissociation in water of $Na^+$, $K^+$ or $Li^+$. These anions are also applicable as anions of the invention. There will be available anion residues such as, for example, $HCO_3^-$. Accordingly, the amount of the Component (D) corresponds to the amount of $Mg^{2+}$ and, when carbonates of hydrogencarbonate are used, varies in correspondence with the amount of $Na^+$, $K^+$ or $Li^+$. Anion residues available from compounds added for other purposes such as, for example, sodium chloride may be also used. The total amount of the anions is in the range from 0.5 to 7.0, preferably from 0.7 to 3.5 equivalents based on the maleic acid derivative unit in the Component (A).

Finally, the Component (E); i.e., water is essential for the preparation of the phase-reversible composition. The various ions in the Composition are present in water at low temperature either independently from one another or in weak interaction, the entire composition being liquid; whereas the interaction is enhanced with an increase in temperature to a cross-linked state thereby forming a solid with water contained therein. When the solidified composition is cooled, it will again be liquid to recover fluidity. The amount of water is suitably from 1 to 1000 times, preferably from 2 to 500 times the total amount of the Components (A), (B), (C) and (D), and should be determined in accordance with the viscosity in liquid state and the strength in solid state which are desired for a particular application of the final composition.

The composition when heated is solid and variable from a jelly-like to a rubber-like condition depending upon the quantitative relations of the components (A), (B), (C), (D) and (E), respectively.

It has now been found that the absence of any one of the above components or departures from the specified relative amounts of the individual will fail to produce the desired composition of the invention.

A process for preparing the compositions according to the invention will now be described. A conjugated diene-maleic acid derivative copolymer of the class described having terminal group R'''—Y— and a predetermined amount of an alkali metal compound, ammonium, amine or a mixture of the two are blended in water and reacted with stirring at a temperature ranging from room temperature to the boiling point of the water. The pH of the aqueous alkali metal salt or amine salt solution of conjugated diene-maleic acid derivative copolymer in this reaction should be in the range from 7 to 14, preferably from 7 to 12. Lower pH than 7 will fail to produce the intended results in the invention, even with addition of a magnesium compound in the step of process thereafter described.

A predetermined amount of magnesium compound is added to the resulting aqueous solution after cooled. When the magnesium compound is used in an amount corresponding to 0.5–0.8 equivalent of $Mg^{2+}$ based on the maleic acid derivative unit, with a starting copolymer having an intrinsic viscosity of 0.6, the resulting solution will be a phase-reversible composition contemplated by the invention. The solution, when heated to a temperature above about 80° C., changes into a jelly-like solid, and when cooled, returns to the initial liquid state; thus, the composition undergoes reversible change between a liquid and a solid phase.

When the magnesium compound is added in an amount corresponding to 0.8–2.5 equivalent of $Mg^{2+}$ based on the maleic acid unit, the solution becomes cloudy and on being disposed still undergoes liquid-liquid phase separation into a low-viscosity upper layer and a high-viscosity lower layer. The lower layer, when heated, becomes gradually solidified with an increase in temperature from about 60° C., and turns into a strong, rubbery, elastic solid at 80° C. or above. When the solid is cooled, it will then gradually be liquefied and return finally to the initial liquid state. This lower layer is the composition of the invention. Atomic absorption spectrum analysis shows that the lower layer does not contain the whole amount of $Mg^{2+}$ ions formed from the magnesium compound used, but a portion of the $Mg^{2+}$ ions remains in the upper layer at the time of two-layer separation.

With the magnesium compound added in an amount corresponding to 0.8–2.5 equivalents of $Mg^{2+}$ based on the maleic acid derivative unit, the whole solution is heated with stirring without undergoing the two-layer separation, a solid mass is precipitated in the solution. Said solid is separated by filtration while the reaction mixture is hot than a liquid, which, when heated, becomes a rubbery solid is obtained. The composition of the mass is the same as that of the lower-layer solution obtained by the two-layer separation. The two compositions are identical.

If the composition that will be a rubbery solid, when heated, is diluted with water, the strength of the solid is reduced finally to give a jelly-like solid. It is thus to be noted that the two compositions, one exhibiting a jelly-like tendency and the other exhibiting a rubber-like tendency when heated, are substantially identical and both are within the definition of the phase-reversible compositions according to the invention. This indicates that adjustment of the amount of $Mg^{2+}$ ions in the composition allows change of the properties of the solid obtained with heating, and this is one of the distinguished features of the invention.

In the event that for instance, the composition is found deficient in the amount of the Component (B); namely, alkali metal cations or ammonium ions, it will suffice to simply add a required amount of alkali metal compound or amine, followed by thorough stirring thereby providing a phase-reversible composition of the invention. The same is seen with other compornent.

As an alternative process for the preparation of a composition according to the invention may be mentioned a process which comprises feeding predetermined amounts of a conjugated diene-maleic acid derivative copolymer, a base such as alkali metal compound or amine, a magnesium compound and water all at a time into a reactor and heating the mixture with stirring, whereby there may be obtained a desired phase-reversible composition.

When the composition thus obtained is taken into a large amount of a hydrophilic solvent such as methanol or acetone to form precipitates which are separated by filtration and dried in vacuo there may be obtained a hard glass-like solid. Evaporation of the water directly from the composition gives a solid plate or film. These solids are convenient to handle in storage or transportation and can be converted to the desired composition, when it is put to use, by adding a predetermined amount of water and thoroughly stirring them to a homogeneous liquid.

In addition to the properties of the phase-reversible composition of the invention that it is reversibly changeable in its phase between liquid and solid as above discussed, the invention provides excellent compatibility and high surface-activity. These additional features are attributed to the oleophilic group which are introduced at the terminal of the high-molecular anion in the Component (A). The olephilic group functions to form a hydrophobic bond with other organic substances thereby to enhance the solubility of the latter. When the high-molecular anions in the Component (A) are taken as a whole, the anion portion of the conjugated diene-maleic acid derivative copolymer is hydrophilic and the terminal group is hydrophobic, which affords excellent surface-activity to the final composition. For these features of the invention, the phase-reversible compositions may find wide application in commerce, as for example an adhesive compound, a fire-fighting agent, viscosity-control agent, a tackifier, a coating agent, a dyeassistant and the like. When applied as a foam-type fire-fighting agent, the product of the invention exhibits excellent foaming ability due to its surface-activity. The foams generated will increase in their strength with increasing temperature when the composition is exposed to flames. In order to increase the quantity of foams to be generated, there may be added a surface-active agent, and the amount of such additive may be adjusted at will since the phase-reversible composition of the invention is highly compatible.

The product of the invention is also highly comiscible with or dispersible in a wide variety of dyes or textile printing agents. Furthermore, when heated as in the usual dye treatment, the phase-reversible composition can be made use of its gelation property for effectively setting the dye. Conversely, it may be utilized as a resist glue for the composition can readily return to a liquid state on cooling.

COMPARATIVE EXAMPLE 1

To a 3-liter autoclave equipped with stirrer and gas intake tube, and purged with nitrogen gas, were charged 2,500 milliliters acetone, 294 grams maleic acid anhydride and 4.9 grams azo-bis-isobutylnitrile. Reaction was continued at 70° C. with 162 grams butadiene added slowly over a duration of 4 hours. The reaction product was introduced in small droplets into large amounts of benzene to precipitate a polymer. The resulting polymer was filtrated, washed with benzene and dried in vacuo for 50 hours, thereby obtaining 300 grams refined polymer. An instrinsic viscosity of this polymer was 0.64 when determined in cyclohexanon at 30° C. These measuring conditions are the same throughout the ensuing examples. Nuclear Magnetic Resonance (NMR) spectrum analysis indicated that the terminal group originated by the radical initiator was not great enough to be quantitatively determined. 15.5 grams polymer was charged to a 300 milliliter separable flask equipped with stirrer and reflux condenser, followed by the addition of 155 grams water and 7.2 grams sodium hydroxide. The admixture was heated with stirring for 2 hours, until there was obtained a transparent solution. This solution, after being cooled, was added with 90 milliliters magnesium chloride of 1 mol/-liter concentration, stirred vigorously and held still overnight, until the solution was separated into two layers. The viscous lower layer was abstracted. This liquid composition changed into a rubber-like solid when heated at a temperature of 70° C. or above and returned to its initial liquid state when cooled to below room temperature. The liquid composition here obtained will be referred to as C-1. 30 grams Composition C-1 was added with 5.0 grams solution of 40 percent layryl sulfate triethanolamine salt (surface active agent) and stirred for 5 hours. The resulting solution was heterogenous and opaque. It was diluted with 190 grams water and checked for its expansion ratio, which was 4.9.

EXAMPLE 1

The same apparatus and method as used in comparative Example 1 were employed for the reaction of 2,500 milliliters acetone, 294 grams maleic anhydride, 162 grams butadiene, 4.9 grams azo-bis-isobutylnitrile and 18.0 grams n-dodecylmercaptan. There was obtained 278 grams butadiene-maleic acid anhydride copolymer. The viscosity of this polymer was 0.21. Its sulfur content was 0.33 percent. Terminal dodecylthio radicals as calculated from the sulfur content were 2.2 percent of the polymer, well corresponding to an NMR value of 2.3. 15.5 grams polymer was charged to a separable flask of the type used in comparative Example 1, followed by the addition of 155 grams water and 10.7 grams potassium hydroxide. The whole was stirred at room temperature for 4 hours. The solution thereby obtained was added with 130 milliliters of 1 mol/liter magnesium sulfate and stirred vigorously. It was then heated for 2 hours with use of a hot bath of 100° C. but with no stirring, whereupon the solution was separated into a rubber-like solid phase and a liquid phase, respectively. The liquid layer was removed, and thereafter the flask was cooled, whereby the rubbery solid became progressively liquefied. After a lapse of one hour, there was obtained a viscous transparent liquid. This will be hereafter referred to as E-1.

EXAMPLE 2

A separable flask of 500 cc. was charged with 15.5 grams polymer of Example 1, 20.2 grams triethylamine, 12.9 grams magnesium acetate 4H$_2$O and 200 grams water. The charge was stirred for 4 hours at room temperature, until there was obtained a transparent, homogeneous solution. A portion of this solution was withdrawn into a test tube and heated, until it lost its fluidity and turned into a jelly. This jelly-like product returned to its initial liquid state when cooled. It is referred to as E-2.

EXAMPLE 3

10 grams Composition E-1 obtained in Example 3 was admixed with 190 grams water. The resulting solution was checked for its foaming ability, revealing an expansion ratio of 3.0 by Weeks method. This evidenced satisfactory surface-activity of Composition E-1. The composition E-2 also showed the same surface-activity.

EXAMPLE 4

The procedure of comparative Example 1 was followed in the reaction of 204 grams isoprene, 294 grams maleic acid anhydride, 4.9 grams azo-bis-isobutylnitrile, 30.0 grams n-butylmercaptan and 2,500 milliliters acetone. There was obtained 340 grams isoprene-maleic anhydride copolymer. This polymer had an intrinsic viscocity of 0.11, and butylthio radicals therein were 3.5 percent as determined by sulfur analysis and NMR spectrum. 17.2 grams polymer was charged to a 500-milliliter separable flask, followed by the addition of 12.3 grams potassium hydroxide and 300 grams water. The whole was heated with stirring for 2 hours, until it was liquid. The liquid, after being cooled, was added with 60 milliliters solution of 1 mol/liter magnesium chloride and stirred. The liquid composition thereby obtained was heated at 90° C. when it turned into a jelly and reversely cooled to room temperature when it returned to its initial liquid state. This composition is referred to as E-4. 1.0 grams of this composition was admixed with 1.5 grams of C.I. Disperse Orange 13, B-3E, and 50 grams of water thereby obtaining a dye solution. At the same time, 1.0 gram of Composition C-1 was admixed with 1.5 grams of Dyanics Orange B-3E and 50 grams of water, to prepare a dye solution. The two dye materials were compared for dispersability. The former was well dispersed even after a lapse of 12 consecutive hours, while the latter precipitated after a lapse of 2 hours.

EXAMPLE 5

The procedure of comparative Example 1 was followed in the reaction of 162 grams butadiene, 336 grams citraconic acid anhydride, 20 grams paratoluenethiol, 15.9 grams lauroylperoxide and 2,500 milliliters cyclohexanon. There was obtained 240 grams butadiene-citraconic anhydride copolymer, which had an intrinsic viscosity of 0.19 and paratoluylthio in an amount of 6.7 percent of the total polymer. 17.7 grams polymer, 7.1 grams lithium hydroxide 1H$_2$O solution and 400 grams water were charged to a 500-milliliter separable flask and heated with stirring for 2 hours. The whole, after being cooled, was further added with 70 milliliters of 1 mol/liter magnesium acetate solution and stirred for 1 hour. A portion of the resulting liquid was sampled and heated, whereupon it turned into a jelly-like solid. This solid returned to its initial liquid state when cooled back. The composition is referred to as E-5. 30 grams of this composition were kneaded and admixed with 100 grams of 25 percent solution of polyvinylalcohol having a saponification value of 85 percent and a polymerization degree of about 500. The admixture was disposed at room temperature for 7 days, whereupon both were found satisfactorily mixed and dispersed. The composition turned out to be somewhat hard jelly-like solid when it was heated, and returned to its initial liquid state when cooled.

tween 100:0 and 0:100 and having terminal groups of the formula $$R'''-Y- \qquad (III)$$

wherein R''' represents an organic radical having from 4 to 30 carbon atoms; and Y represents S or SO$_2$, said terminal group being in amount of between 0.5 and 30 weight percent of the copolymer;
(B) one or more group consisting of Na+, K+, Li+ and ammonium cations of the formula $$R_1R_2R_3R_4N^+ \qquad (IV)$$

wherein R$_1$, R$_2$, R$_3$, and R$_4$ are the same or different, each selected from the group consisting of hydrogen, alkyl radical cycloalkyl radical, aryl radical and aralkyl radical having from 1 to 18 carbon atoms, said cations being from 0.5 to 5.0 equivalents based on the maleic acid derivative unit in the Component (A);
(C) Mg$^{2+}$ of from 0.5 to 2.0 equivalents based on the maleic acid derivative unit in the Component (A);
(D) one or more anions which form a water-soluble magnesium compound with Mg++, said anion being from 0.5 to 7.0 equivalents based on the maleic acid derivative unit in the Component (A); and
(E) water in an amount from 1 to 1,000 times the total weight of the Components (A), (B), (C), and (D).

2. A composition as claimed in claim 1 wherein said

TABLE 1

| | | Composition | | | | |
|---|---|---|---|---|---|---|
| | | (A) | (B) | (C) | (D) | (E) |
| Example No | I:II | Maleic Acid Derivative Unit | Equi-Valent | Equi-valent | Equi-valent | E/A"B"C"D (Wt. Ratio) |
| Comp.1 (C-1) | 8:2 | 1 | 1:09 | 0.74 | 0.80 | 5.1 |
| Ex. 1 (E-1) | 9:1 | 1 | 0.91 | 1.00 | 0.52 | 4.3 |
| Ex. 2 (E-2) | 10:0 | 1 | 2.00 | 0.60 | 1.20 | 4.5 |
| Ex. 4 (E-4) | 10:0 | 1 | 2.20 | 0.60 | 1.20 | 10.2 |
| Ex. 5 (E-5) | 7:3 | 1 | 1.70 | 0.70 | 1.40 | 14.1 |

What is claimed is:
1. A phase-reversible composition comprising:
(A) a high-molecular anion resulting from the dissociation of at least a part o the carboxylic group of a conjugated diene-maleic acid derivative copolymer, having repeating units of the formulae

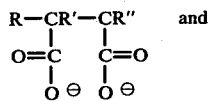 and 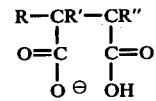

(I)    (II)

wherein R represents a conjugated diene unit in the copolymer; R' and R'' each represent hydrogen, a halogen atom or an organic radical having from 1 to 18 carbon atoms, the degree of dissociation in terms of the ratio of I:II being in the range of beconjugated diene unit is one selected from the group consisting of butadiene, isoprene, chloroprene, 2,3-dimethylbutadiene, 2,3-dichlorobutadiene, piperilene, 2-methyl-1,3-hexadiene, 2,4-hexadiene and 1-methoxy-1,3-butadiene.

3. A composition as claimed in claim 1 wherein said maleic acid derivative unit is one selected from the group consisting of maleic acid, chlormaleic acid and citraconic acid.

4. A composition as claimed in claim 1 wherein said anion is one selected from the group consisting of Cl-, Br-, SO$_4^{2-}$, MnO$_4^-$, NO$_3^-$, ClO$_4^-$, HCOO-, CH$_3$COO-, CH$_3$CH$_2$COO- and

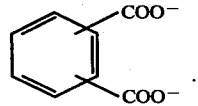

5. A composition as claimed in claim 1 wherein said conjugated diene-maleic acid derivative copolymer has an intrinsic viscosity of the order of 0.01 to 2.0.

* * * * *